March 1, 1960 J. A. RAJCHMAN 2,927,307

MAGNETIC SWITCHING SYSTEMS

Filed Nov. 1, 1954 2 Sheets-Sheet 1

INVENTOR.
JAN A. RAJCHMAN
BY Morris L. Rabkin
ATTORNEY

March 1, 1960 J. A. RAJCHMAN 2,927,307

MAGNETIC SWITCHING SYSTEMS

Filed Nov. 1, 1954 2 Sheets-Sheet 2

INVENTOR.
JAN A. RAJCHMAN
BY Morris A. Rabkin
ATTORNEY 2,927,307
Patented Mar. 1, 1960

2,927,307

MAGNETIC SWITCHING SYSTEMS

Jan A. Rajchman, Princeton, N.J., assignor to Radio Corporation of America, a corporation of Delaware Application November 1, 1954, Serial No. 465,842

17 Claims. (Cl. 340—174)

This invention relates to magnetic systems and particularly to the control or the switching of electrical signals by means of such systems.

Magnetic core elements are employed in the electrical arts to perform various control and switching functions. Magnetic cores are used as "and" gates. That is, the core is arranged to furnish a relatively large output signal in response to the simultaneous presence of a predetermined number of input signals of proper polarity and amplitude. Substantially no output signal is furnished in response to any number less than the predetermined number of input signals. Switching networks employing magnetic cores are also used in coding and decoding information represented by combinations of electrical signals.

In a copending application, entitled "Magnetic Systems," Serial No. 455,725, filed by Jan A. Rajchman and Arthur W. Lo, September 13, 1954, there is described a "transfluxor." A transfluxor is useful, for example, in the control and the switching of electrical signals. The transfluxor includes a body of magnetic material having the characteristic of being substantially saturated at remanence. Two or more apertures and a plurality of distinct flux paths are provided in the body. A selected one of the flux paths includes two different portions of magnetic material. Each of the two portions is, respectively, in common with each of two other non-selected flux paths. By applying suitable excitation currents to windings linking the non-selected flux paths, the two common portions of the selected flux path can be set to the same or to opposite states of saturation at remanence. An A.C. (alternating current) signal is applied to an A.C. winding linking the selected flux path. When the two common portions are in the same state of saturation at remanence, an output signal is induced in the output winding by the A.C. signal. When the two common portions are in opposite states of saturation at remanence, no signal is induced in the output winding. Thus, the transfluxor can be considered to have two magnetic response conditions. In one of the response conditions, the A.C. input signal is blocked, and in the other response condition, the A.C. input signal is transmitted. The transfluxor "remembers" the response condition to which it is set for an indefinitely long period of time. Also, the transfluxor can be operated to its other response condition by a new input signal which is applied to one of the previously mentioned two input windings. No holding power is required by the transfluxor.

It is an object of the present invention to enhance the usefulness of magnetic control systems and switching networks by extending the application of the transfluxor in such systems and networks beyond its previous use.

Another object of the present invention is to provide a novel magnetic gate.

Still another object of the present invention is to provide an improved magnetic control system by means of which electrical signals are controlled without requiring holding power.

A further object of the present invention is to provide an improved and inexpensive magnetic system for switching electrical signals.

A still further object of the present invention is to provide an improved magnetic switching system useful in coding and decoding information.

Yet another object of the present invention is to provide an improved transfluxor.

The above and further objects of the invention are carried out by providing a body of magnetic material saturable at remanence. An output aperture and a plurality of input apertures are formed in the body. The input apertures are arranged in a cluster adjacent the output aperture. A portion of the magnetic material limiting each input aperture is common to a portion of the magnetic material limiting the output aperture. Thus, there is an individual flux path about each input aperture which has a portion in common with the flux path about the output aperture. At least one input winding individually links the flux path about each different input aperture. An output winding and an A.C. winding each link the flux path about the output aperture. The above arrangement can be considered a multi-input, magnetic "and" gate.

The multi-input gate operates in a manner similar to a transfluxor. When all the portions of the flux path about the output aperture are in one state of saturation at remanence with respect to the output aperture, an A.C. signal applied to the A.C. winding is transmitted to the output winding. When any two of the portions of the flux path about the output aperture are in states of saturation at remanence different from each other, the A.C. signal is blocked.

One explanation of the blocked condition is that postulated in the above-mentioned "Magnetic Systems" application by Jan A. Rajchman and Arthur W. Lo. That is, the law of continuity of flux flow requires that an equal flux change must occur in every portion of the selected flux path in response to the A.C. signal. However, when one of the path portions is saturated with flux in a sense opposite to the sense of the flux in a different path portion, substantially no change of flux can be produced by either phase of the A.C. signal. The lack of flux change results because at least one of the portions is already saturated with flux in the sense in which the magnetizing force tends to increase the flux flow. Thus, in the blocked condition there is substantially no flux change and substantially no output voltage induced in the output winding.

Various embodiments of the multi-input "and" gate, are described hereinafter. The input signals are stored without requiring holding power. The system may be arranged to furnish an output on one winding for one phase of an A.C. signal, and an output on a different output winding for the other phase of the A.C. signal.

The invention will be more fully understood, both as to its organization and method of operation, from the following description when read in connection with the accompanying drawing in which.

Figures 1, 2, 7:
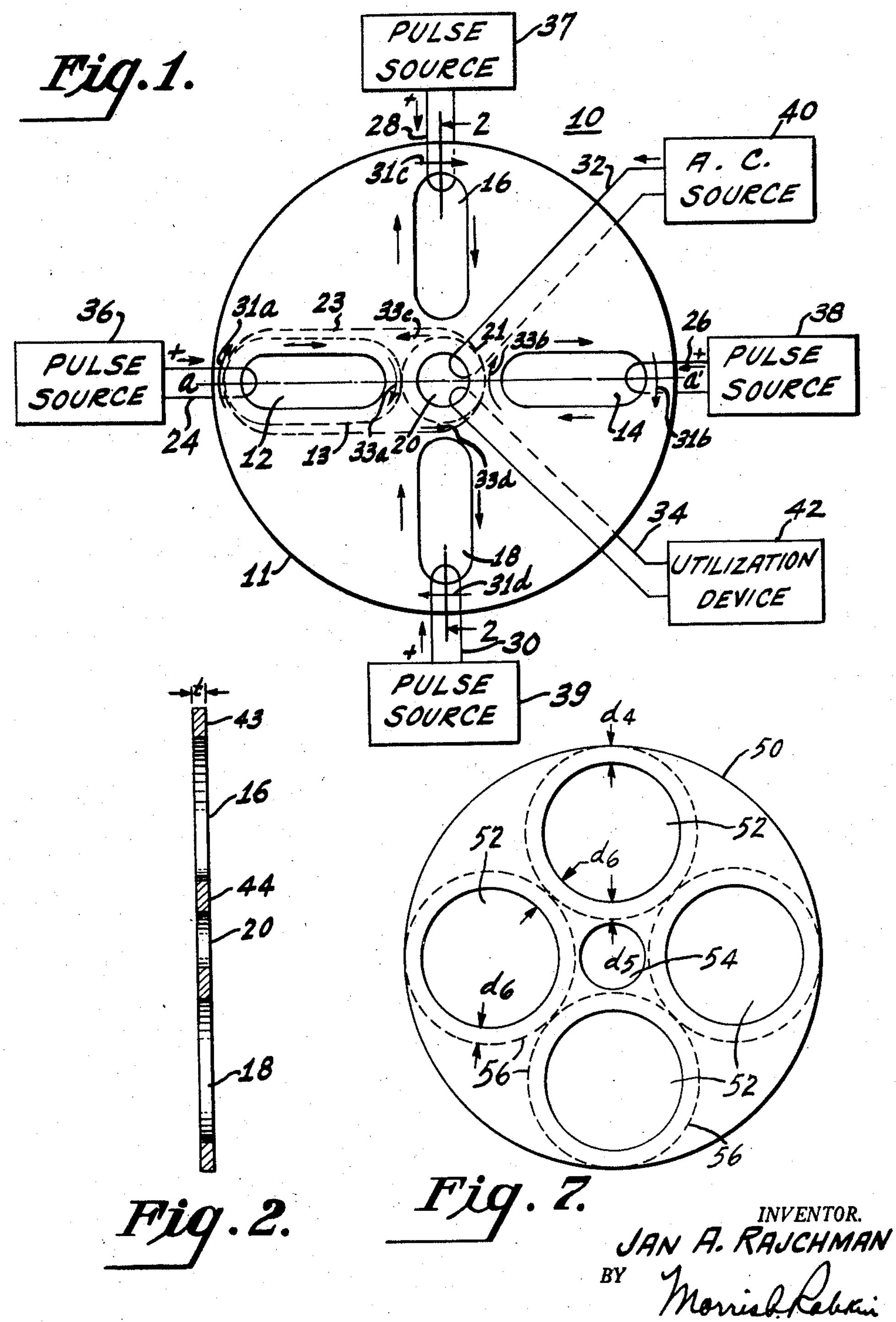
Fig. 1 is a schematic diagram of a magnetic system according to the invention in which a four-input transfluxor is shown in plan view.
Fig. 2 is a cross-sectional view along the line 2—2 of the transfluxor of Fig. 1.
Figure 3:
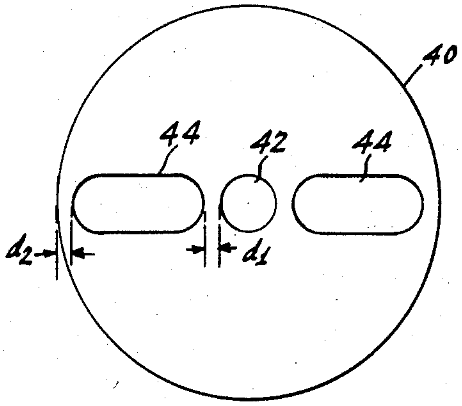
Figure 4:
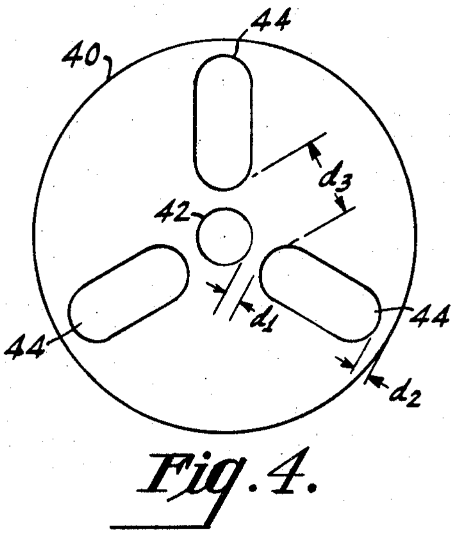
Figure 5:
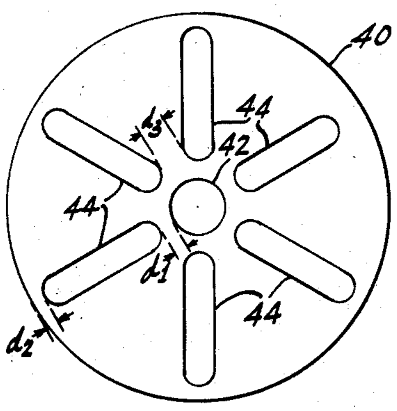
Figure 6:
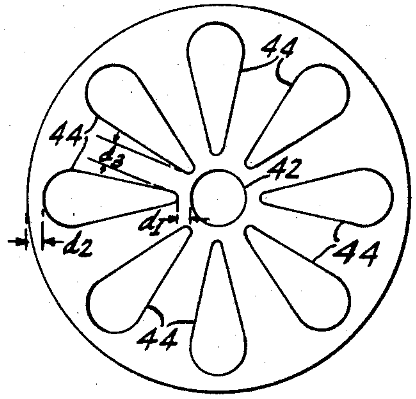

Figs. 3, 4, 5, and 6 are plan views of modified forms of transfluxors of the present invention having, respectively, two, three, six, and eight input apertures;

Fig. 7 is a plan view of another modified form of the transfluxor of the present invention in which all the apertures are circular.

Throughout the figures of the drawing, the same reference numbers are used to designate similar elements.

Referring to Fig. 1, there is shown a magnetic system 10 including a multi-aperture transfluxor 11 provided with input apertures 12, 14, 16, and 18 and an output aperture 20. Illustratively, the transfluxor 11 is fabricated in the form of a disc of magnetic material which is characterized by substantial saturation at remanence. The input apertures 12, 14, 16, and 18 are somewhat elongated along a radial line through the center of the output aperture 20 and are symmetrically arranged in a flower-like pattern about the circular-shaped aperture 20. The advantage derived from this particular shape and arrangement of the apertures is explained hereinafter.

The transfluxor 11 may be molded, for example, from a powder-like, manganese-magnesium ferrite and annealed at a suitable temperature to obtain the desired magnetic characteristics. Other magnetic materials having the characteristic of being substantially saturated at remanence may be employed. There is an individual, distinct flux path about each of the apertures. By way of example, one flux path about the input aperture 12 is represented by the dotted line 13. The flux path about the other input apertures is similar to the path 13. The flux path about the output aperture 20 is represented by the dotted line 21. In addition to the individual flux path about each of the apertures, there exists four longer flux paths which are presently of interest, each longer flux path being about both the output and one of the input apertures. One of these longer flux paths is represented by the dotted line 23 which includes both the input aperture 12 and the output aperture 20. Each of the respective flux paths about the input apertures 12, 14, 16 and 18 is respectively linked by one of the input windings 24, 26, 28 and 30. For example, the winding 24 is made to link the flux path 13 about aperture 12 by passing the winding 24 along the top surface of the disc 11, then down through the aperture 12, and then along the bottom surface of the disc 11. An A.C. input winding 32 and an output winding 34 link the flux path about the output aperture 20. The windings 32 and 34 are arranged to thread aperture 20 similar to the way in which winding 24, described in the above example, threads the aperture 12. The input and output windings are shown as single-turn windings for purposes of illustration. When desired, multi-turn windings may be employed. The pulse sources 36 through 39 are respectively connected to the input windings 24, 28, 26 and 30. Any suitable source of current pulses, for example, a current source with a vacuum tube control, may be employed. The current source, for example, may be in series with tubes connected in suitable switching circuits (not shown in detail) such as flip-flop circuits. The A.C. winding 32 is connected to a suitable source 40 of A.C. current. It is not necessary that the phases of the A.C. signal be periodic. The output winding 34 is connected to any utilization device 42 which is responsive to a voltage signal induced across the output winding 34.

Fig. 2 is a cross-sectional view along the line 2—2 of the transfluxor 11 of Fig. 1. The thickness *t* of the disc 11 is substantially uniform throughout. It is not essential that the thickness of the disc 11 be uniform, as deviations in uniformity can be compensated for by differences in the area of the saturable legs. With a disc of uniform thickness, the distance 43 between the periphery of the disc 11 and the outer boundary of the input aperture 12 is substantially equal to the distance 44 between the outer boundary of the output aperture 20 and the opposite, inner boundary of the input aperture 12. Each of the remaining input apertures 14, 16, and 18 is similarly located between the output aperture 20 and the periphery of the disc 11.

The conventions regarding the sense of flux flow around a closed path, and the corresponding state of saturation of the magnetic material which were adopted in describing the operation of the transfluxors of the aforementioned "Magnetic Systems," application, Ser. No. 455,725, by Jan A. Rajchman and Arthur W. Lo, are retained herein. Briefly, there are two senses of flux flow around a closed path. A positive current flow through a surface bounded by the path produces a clockwise (as viewed from one side of the surface) flux flow around the closed path. One state of saturation at remanence, with reference to a closed flux path, is that in which the saturating flux is directed in a clockwise sense around the closed path; and the other state of saturation at remanence with reference to that path is that in which the saturating flux is directed in the counter-clockwise sense (as viewed from the same side of the surface) around the closed path.

The operation of the system of Fig. 1 is as follows: Assume that a positive excitation current is applied to the winding 24 by the pulse source 36. The direction of a positive current in the embodiment of Fig. 1, and also in the embodiments of the invention which are subsequently described, is indicated by an arrow marked with a plus sign adjacent the particular windings. The amplitude of this positive current is sufficient to establish a clockwise flux flow in the flux path 13 about the input aperture 12, as indicated by the solid arrows 31*a* and 33*a* along the path. The sense of flux flow in the portion of magnetic material common to the input aperture 12 and the output aperture 20 is clockwise with reference to input aperture 12 and counter-clockwise with reference to the output aperture 20, as represented by the arrow 33*a*. If a like, positive excitation is also applied by each of the pulse sources 37, 38, and 39 to the respective windings 28, 26, and 30, the sense of flux flow in all the portions in common with the output aperture flux path 21 is counter-clockwise, as indicated by the arrows 33*b*, 33*c*, and 33*d*. Therefore, all the common portions of the output aperture flux path are in the same state of saturation at remanence with reference to the output aperture 20. Under these conditions, a positive input current pulse of proper amplitude applied to the A.C. winding 32 by the A.C. source 40 reverses the sense of flux flow in all portions of the flux path 21 from the counter-clockwise sense to the clockwise sense with reference to output aperture 20. The following phase of the A.C. current in A.C. winding 32 then reverses the sense of flux flow in the path 21 back to the initial counter-clockwise sense. Each time the sense of flux in the flux path 21 is reversed, an output voltage is induced across the output winding 34. The reversal of the sense of flux flow in the flux path 21 can be carried out for an indefinitely long period of time.

Assume, now, that the sense of flux flow in the portions of the flux path 21 is returned to the counter-clockwise sense in the direction of the arrows 33*a* to 33*d*. Also, assume that a negative excitation current is then applied to input winding 30 by the pulse source 39. This negative, excitation current establishes a counter-clockwise flux flow about the input aperture 18 in a sense opposite arrows 31*d* and 33*d* adjacent thereto. The sense of flux flow in the portion of material common to input aperture 18 and output aperture 20, however, is clockwise with reference to aperture 20, in a sense opposite that of the arrow 33*d*. The sense of flux flow in the remaining three portions of the flux path 21 is still counter-clockwise with reference to aperture 20, in the direction of the arrows 33*a* to 33*c*. If, now, the positive input current is applied to winding 32 by A.C. source 40, there is substantially no reversal of the sense of flux flow in any of the portions of the flux path 21, because there are portions thereof saturated in opposite states of saturation at remanence. Likewise, there is substantially no reversal of the sense of flux flow in any of these portions when the negative input current is applied to winding 32. Consequently, no output voltage is induced across output winding 34 when the A.C. excitation is applied.

Further, assume that a negative excitation current is now applied to the winding 28 to establish a counter-clockwise flux about aperture 16, opposite the arrows 31*c* and 33*c* adjacent thereto. The sense of flux flow in the portion of material in common with the apertures 16 and 20 is clockwise with reference to aperture 20, in a sense opposite that of the arrow 33*c*. Again, there is substantially no reversal of the senses of flux flow in the flux path 21 in response to either phase of the A.C. input signal. The non-reversal results because two of the common portions of the flux path 21 are saturated in the state of saturation at remanence opposite to the state of saturation at remanence of the other two common portions.

Similarly, if a negative excitation current is applied to the input winding 26 by the pulse source 38, a counter-clockwise flux flow is established about aperture 14 in the direction opposite to arrows 31*b* and 33*b* adjacent thereto. Hence, the sense of flux flow in the portion of magnetic material common to the input aperture 14 and the output aperture 20 is clockwise with reference to aperture 20, opposite the direction of the arrow 33*b*. Neither the positive nor the negative phase of the input A.C. signal reverses the senses of flux flow in the flux path 21 because at one portion common to apertures 12 and 20 is saturated the remanence in the state opposite to that of the other three common portions.

If, now, a negative excitation currentt is applied by the pulse source 36 to the input winding 24, all the common portions of the flux path 21 are saturated with flux in the clockwise sense (opposite the arrows 33*a* to 33*d*) with reference to aperture 20. Therefore, the first succeeding negative phase of the A. C. signal current in winding 32 reverses the sense of flux flow in the path 21 to the counter-clockwise sense with reference to the output aperture 20. The following positive phase of the A.C. signal then reverses the sense of flux flow in the path 21 back to the initial clockwise sense, and so on for an indefinite number of negative and positive phases. The reversal of flux flow in the path 21 occurs because all its portions are saturated in the same state of saturation at remanence. Upon each reversal of flux along the path 21 about the output aperture 20, there is an output voltage induced across the output winding 34.

The magnetic system of Fig. 1, then, can be considered as a four-input, magnetic "and" gate. The gate is primed when four input signals of proper polarity and amplitude have been applied to the different input windings. Note that the four input signals can be applied in any order. Because each input signal causes a substantial flux flow only about the corresponding input aperture, only the common portion of the flux path limiting this input aperture is affected by this flux flow. The gate is blocked when any two of these common portions are saturated in opposite senses with reference to the output aperture.

There are several important advantages in the magnetic system of Fig. 1. Firstly, the input signals need not occur concurrently, that is, within a specified time interval, as is the case with prior "and" gate elements. Therefore, in asynchronous systems, the requirement for additional staticizers or storing registers to hold one signal until another occurs may be eliminated. Secondly, the input signal does not affect the output circuit, because only one of the common portions of the output aperture flux path is changed by any one input signal. Likewise, the A.C. signal does not affect the input circuit because only the flux flow in the output aperture flux path is reversed by the A.C. signal. Therefore, the read-in and read-out of the information stored in the magnetic gate are virtually independent of each other. As an inciden, therefore, the impedances of the input and output circuits need not be matched. Thirdly, once the gate is primed, the A.C. signal can be applied for an indefintely long period of time without affecting the stored signals. Therefore, additional resetting or restoring circuits are not required as in the case of prior magnetic core devices which, unless such additional circuits are provided, retain the stored signal only until a reading signal is applied. Furthermore, the system of Fig. 1 remains in the primed or set condition without requiring holding power.

The system of Fig 1 can also be considered as a control system which is operated by positive and negative polarity input signals. For instance, assume that an input signal is applied to each of the input windings, following which the A.C. signals are applied to the A.C. winding. If the four input signals were of the same polarity, the A.C. signals are transmitted to the output circuit. If any two of the input signals are of different polarities, the A.C signals are "blocked" from the output circuit. It is not necessary to apply the controlling signals in any given time sequence. The transfluxor stores each previously applied input signal, and the saturation at remanence of each common portion remains set by the initial input signal unless a different polarity signal is applied to an input winding, thereby changing the saturation at remanence of a common portion. For example, assume that three like-polarity signals are applied to three of the input windings and a sequence of input signals is then applied to the fourth input winding. If, now, the A.C. signals are applied to the A.C. winding subsequent to each pulse of the sequence, the A.C. signals will or will not be transmitted to the output winding in accordance with the polarity of each pulse of the sequence. If the input pulse of the sequence is of the same polarity as the other three input pulses, the A.C. signal is transmitted, otherwise, the A.C. signal is "blocked." Note that, if desired, a multi-input transfluxor can be operated with two or more of the inputs serving to control the transmission of the A.C. signal. The remaining inputs are then null inputs. However, unlike electronic or prior magnetic devices, it is not necessary to change a bias potential or the amplitude of the input signals when less than all the inputs are used as control inputs. Thus, the multi-input transfluxor is more versatile in that the number of controlling signals can be changed at any time without altering its operation in any respect.

It is also possible to determine the polarity of the input signals. For example, if the input signals are of a positive polarity, the first positive phase of the A.C. signal causes a flux reversal; whereas if the input signals are of a negative polarity, the first negative phase of the A.C. signal causes a flux reversal. Therefore, the first phase of the A.C. signal which causes a voltage to be induced in the output winding can be related to the polarity of the input signals.

In designing a transfluxor similar to the flower-like arrangement of the disc 11, certain dimensions and properties should be considered. For example, assume that the transfluxor is blocked by means of applying a negative excitation current to the input winding 24. The sense of flux flow in the three common portions adjacent the apertures 14, 16, and 18 is then counter-clockwise with reference to aperture 20 as indicated by the solid arrows 33*b*, 33*c*, and 33*d* in these respective portions. The sense of flux flow in the common portion adjacent aperture 12 is clockwise, in the direction opposite the arrow 33*a* in this portion, with reference to aperture 20.

Assume, now, that an intense, positive current pulse is applied by A.C. source 40 to winding 32. The magnetizing force exerted by this positive pulse cannot cause a reversal of flux flow in the path 21 because of the clockwise flow with reference to aperture 20 in the portion adjacent aperture 12. However, the magnetizing force can conceivably cause a flux reversal along the longer flux path 23 which encompasses the two apertures 12 and 20. The flux could reverse along the longer path 23 because of the counter-clockwise flux flow with reference to the aperture 20 in the portion of the material limiting aperture 12, that is, in a direction opposite arrow 31*a*. The approximation that the magnetizing forces exerted along a flux path are inversely proportional to the length of the path is reasonable in the case of the magnetic materials in question. Such an approximation is sufficiently accurate to serve as the basis for the design of apparatus. Consider the relatively short path 21 around the aperture 20, and the relatively long path 23 around both the apertures 12 and 20 with respect to the above approximation. The amplitude of the A.C. current pulses applied to the winding 32 are regulated so that there is sufficient magnetizing force to cause a reversal of the sense of flux flow around the aperture 20, but insufficient to cause a reversal of the sense of flux flow in the longer path 23. Thus, when any two common portions have opposite senses of flux flow, as by applying a negative, current excitation to one input winding, the gate remains unresponsive to the A.C. current pulses because no reversal occurs in the sense of flux flow in either the flux path 21 or the flux path 23. The range of permissible variation in the amplitude of the A.C. current pulses is, therefore, a function of the ratio of the length of the flux path 23 to the length of the flux path 21. By providing the input apertures with the elongated shape described, the above ratio is increased to a relatively large value.

The maximum amount of useful load current which can be furnished may be calculated on the basis of the above-mentioned approximation and on the basis of the ratio between the length of the longer path 23 and the length of the shorter path 21.

As a result of the longer path around the input apertures, the ratio between the length of the longer flux path 23 and the length of the flux path 13 about an input aperture becomes close to unity. It would appear from this arrangement that the amplitude of the setting current pulses applied to an input winding is very critical because the amplitude of a setting pulse must be sufficient to cause a flux reversal in the path 13, but not sufficient to cause a flux reversal in the path 23. If the setting pulse caused a flux reversal along the path 23, the transfluxor might be blocked when it should not be. For example, if a positive setting pulse were first applied to the winding 26, the common portion adjacent aperture 14 would have a flux flow in the counter-clockwise sense around the aperture 20. Now, if a positive, setting pulse applied to the winding 24, where of an amplitude sufficient to cause a flux flow both in the shorter path 13 and the longer path 23, then the flux flow in the common portion adjacent aperture 12 would be in a counter-clockwise sense with reference to the aperture 20. The flux flow in the common portion adjacent aperture 14 would be reversed to a clockwise sense with reference to the aperture 20. Therefore, no matter what polarity current pulses were applied to windings 28 and 30, the transfluxor would be in the blocked condition.

The above possibility of faulty operation of the transfluxor is prevented by making the distance 43 of Fig. 2 equal to the distance 44. Thus, referring to Fig. 1, the minimum cross-sectional area of the material between the periphery of the disc 11 and any one of the input apertures, such as 12, is equal to the minimum cross-sectional area of the common portion of the material between the inner surface of an input aperture and the wall of the output aperture 20. Again the thickness of material is assumed to be uniform.

Consider the flux changes resulting from a sharp rising current pulse applied to the winding 24 as this current pulse increases from zero value to its maximum amplitude. Although the rise time of the pulse is extremely short, it is far from being instantaneous. Therefore, the magnetizing force exerted along the path 13 is greater than the magnetizing force exerted along the longer path 23. Accordingly, the flux change first occurs in the common portion adjacent aperture 12 and increases with the current rise until this common portion is saturated. That is, the state of saturation of the common portion adjacent to the aperture 12 is reversed. A further increase in current produces substantially no change of flux in the diametrically opposite common portion adjacent to the aperture 14. The failure to produce a flux change in this latter common portion results from the fact that substantially no further flux change is possible in the portion of material located between the periphery of the disc 11 and the outer wall of aperture 12. Thus, the total possible flux change in the flux paths 13 and 23 is determined by the minimum cross-sectional area of the outer portion of material limiting the aperture 12. Accordingly, the flux in the common portion adjacent aperture 12 is completely reversed, and substantially no flux change occurs in the diametrically opposite common portion. Any flux change which occurs in the longer path 23 causes a corresponding output voltage to be induced in output winding 34. However, it is known that a current flow in the load circuit tends to oppose any change of flux produced by the input current. Therefore, any loading of the output circuit aids in preventing a flux change in the longer path 23.

An additional design consideration related to the fabrication of the flower-like transfluxors is the minimum cross-sectional area of the material between two adjacent input apertures. This first minimum cross-sectional area should be equal to or greater than twice a second, minimum cross-sectional area of the magnetic material limiting an input aperture. The second area is a cross-sectional area taken at a line through the limiting material of the aperture 20 at the most restricted portion, such as the line *a—a'* of Fig. 1. The reason for this consideration is that the first area must be able to accommodate the sum of the flux changes due to inputs causing flux changes about each two adjacent input apertures. For example, when a flux flow is established about aperture 12, the total flux change is determined by the minimum cross-sectional area of the common portion adjacent thereto. The same flux change occurs when a flux is established about aperture 16. The first minimum cross-sectional area of the material between the apertures 12 and 16 should be able to accommodate the total of both these flux changes. The need for the accommodation is because the flux change in this first area, due to an input current applied to the winding 24, is in the clockwise sense with reference to aperture 12, and the flux change in this first area, due to an input current applied to the winding 28, is in the counter-clockwise sense with reference to aperture 12. Therefore, the flux due to the two inputs is in opposite directions in this first area, which area should be adequate to accommodate the total flux change.

A flower-like transfluxor having *n* input apertures and a single output aperture may be provided. Such a transfluxor can be considered to correspond to an *n* input control circuit or to an *n* input magnetic "and" gate. Referring to Figs. 3, 4, 5 and 6, there are respectively shown a flower-like transfluxor 40 having two, three, six, and eight input apertures 44 and a single output aperture 42. In each of these arrangements of a transfluxor 40, the cross-sectional width *d*1 of material at the most restricted part of a common portion is equal to the cross-sectional width *d*2 of the most restricted part of the portion between the outer edge of an input aperture 44 and the periphery of the transfluxor 40. Likewise, the cross-sectional width *d*3 at the most restricted portion of the cross-sectional area between two adjacent input apertures 44 is equal to or greater than a distance 2*d*1. The manner of operating the flower-like transfluxors of Figs. 3, 4, 5, and 6 is the same as that described in connection with Fig. 1. At least one input winding is provided for each different input aperture. An interrogating winding 32 and an output winding 34 may be provided for the central aperture 42.

The input apertures of the multi-input transfluxors can be shaped differently from the somewhat radially elongated shape previously described. For example, in Fig. 7, a modified form of a multi-input transfluxor 50 is provided with circular-shaped input apertures 52, and a circular-shaped output aperture 54 in a disc of uniform thickness. The flux path 56, individually about each of the input apertures, is indicated by the dotted lines about the respective apertures 52. The distance *d4* between the periphery of the transfluxor 50 and the outer boundary of an input aperture 52 is equal to the distance *d5* between the inner boundary of an input aperture 52 and the boundary of the output aperture 54. The smallest distance *d6* between any two adjacent apertures is equal to a value of 2*d5*.

Two design considerations are of particular importance in constructing a multi-aperture transfluxor. The first consideration is that the minimum cross-sectional area of the portion of material between the outer edge of an input aperture should be equal to the minimum cross-sectional area of the common portion between an input and the output aperture. The second consideration is that the minimum cross-sectional area between any two input apertures should be no less than twice the minimum cross-sectional area of a common portion.

From the foregoing, it is clear that the various flower-like transfluxors of the present invention herein described are inexpensive, easily constructed, magnetic devices which can perform a variety of useful functions advantageously.

Examples of useful functions are as follows:

The transfluxor of the present invention may function as an *n*-input, magnetic control circuit which operates under the control of *n* setting current pulses. The setting pulses do not have to be furnished in any particular order. An input A.C. signal is controlled for an indefinite time without requiring additional circuitry or holding power. In particular, the transfluxor of the present invention may be considered an *n*-input magnetic "and" gate which can store an input signal for an indefinite period of time. Such an "and" gate is particularly suitable in asynchronous systems because it functions both as a storage register and as an "and" gate thereby eliminating the requirement for additional storage devices. More than one input winding can be provided in each input aperture to provide a coincident-current device in respect to an individual input aperture.

It will be apparent to those skilled in the art that the transfluxor of the present invention can be used to perform functions in addition to those described herein.

What is claimed is:

1. A magnetic device comprising a body of magnetic material having the characteristic of being substantially saturated at remanence, said body having a plurality of input apertures and an output aperture, said input apertures being arranged in a cluster about said output aperture, the minimum cross-sectional area of said material between any pair of adjacent input apertures being at least twice the minimum cross-sectional area in said material between any one of said input apertures and said output aperture, a plurality of input windings threaded through said input apertures and an A.C. winding threaded through said output aperture, means for selectively applying an electrical impulse either of one or the other polarity to each of said input windings, and means for applying alternating electrical signals to said A.C. winding.

2. A magnetic device as claimed in claim 1 wherein said input apertures are symmetrically arranged about said output aperture.

3. A magnetic device as claimed in claim 1 wherein each of said apertures is circular in shape.

4. A magnetic device as claimed in claim 1 wherein said input apertures are each elongated.

5. A magnetic device as claimed in claim 1 wherein said output aperture is circular in shape, said input apertures each being elongated along a different radial line through the center of said output aperture.

6. A magnetic device as claimed in claim 1 wherein said body is comprised of a disc of magnetic material.

7. A magnetic device as claimed in claim 1 wherein the thickness of said body is substantially uniform.

8. A magnetic device comprising a body of magnetic material having the characteristic of being substantially saturated at remanence, said material having an output aperture and at least three input apertures disposed radially about said output aperture, the minimum cross-section of said body material between adjacent input apertures being at least twice the minimum cross-section of said body material between either one of said adjacent input apertures and said output aperture.

9. A magnetic device comprising a body of magnetic material having the characteristic of being substantially saturated at remanence, said material having an output aperture and at least three input apertures disposed radially about said output aperture, the minimum cross-section of said material between adjacent input apertures being at least twice the minimum cross-section of said material between either one of said adjacent input apertures and said output aperture, and the minimum cross-section of said material between any input aperture and the periphery of the body being substantially equal to the minimum cross-section of body material between said input aperture and the output aperture.

10. A magnetic device comprising a body of magnetic material having the characteristic of being substantially saturated at remanence, said material having an output aperture and at least three input apertures disposed radially about said output aperture, the minimum cross-section of said material between adjacent input apertures being at least twice the minimum cross-section of said material between either of said adjacent input apertures and said output aperture, said output aperture being substantially circular in shape and each input aperture being elongated in a radial direction.

11. A magnetic device comprising a body of magnetic material having the characteristic of being substantially saturated at remanence, said material having an output aperture and at least three input apertures disposed radially about said output aperture, the minimum cross-section of said material between adjacent input apertures being at least twice the minimum cross-section of said material between either of said adjacent input apertures and said output aperture, said output apertures and each of said input apertures being substantially circular in shape.

12. A magnetic device comprising a body of magnetic material having the characteristic of being substantially saturated at remanence, said material having a central aperture and a plurality of other apertures disposed about said central aperture, the minimum cross-section of said body material between any two of said other apertures being at least twice the minimum cross-section of said body material between said central aperture and any one of said other apertures, and at least one of said other apertures having a dimension different from said central aperture.

13. A magnetic device comprising a body of magnetic material having the characteristic of being substantially saturated at remanence, said material having a circular-shaped central aperture and a plurality of other circular-shaped apertures disposed about said central aperture, the minimum cross-section of said body material between any two of said other apertures being at least twice the minimum cross-section of said body material between said central aperture and any one of said other apertures, and at least one of said other apertures having a dimension different from said central aperture.

14. A magnetic device comprising an annular core of magnetic material having the characteristic of being substantially saturated at remanence and having a plurality of other apertures disposed about the central aperture of said annular core, the minimum cross-sectional area of said core material between any pair of said other apertures being at least twice the minimum cross-sectional area of said core material between any one of said other apertures and said central aperture, two of said other apertures being located along a first center line of said core and another two of said circumferential apertures being located along a second, different center line of said core.

15. A magnetic device comprising an annular core of magnetic material having the characteristic of being substantially saturated at remanence and having a plurality of other apertures disposed about the central aperture of said annular core, said central aperture and each of said other apertures being circular in shape and each of said other apertures being of a size different from said central aperture, the minimum cross-sectional area of said core material between any pair of said other apertures being at least twice the minimum cross-sectional area of said core material between any one of said other apertures and said central aperture, two of said other apertures being located along a first center line of said core and another two of said circumferential apertures being located along a second, different center line of said core.

16. A magnetic device comprising a body of magnetic material having the characteristic of being substantially saturated at remanence, said body having a plurality of input apertures and an output aperture, said input apertures being arranged in a cluster about said output aperture, the minimum cross-sectional area of said material between any pair of adjacent input apertures being at least twice the minimum cross-sectional area in said material between any one of said input apertures and said output aperture, and the minimum cross-sectional area of material between said output aperture and the inner surface of any input aperture being substantially equal to the minimum cross-sectional area of material between the outer surface of an input aperture and the boundary of said body, a plurality of input windings, said input windings being threaded through different ones of said input apertures, an A.C. winding threaded through said output aperture, means for selectively applying an electrical impulse of either one or the other polarity to each of said input windings, and means for applying alternating electrical signals to said A.C. winding.

17. A magnetic device comprising a body of magnetic material having the characteristic of being substantially saturated at remanence, said body having a plurality of input apertures and an output aperture, said input apertures being arranged in a cluster about said output aperture, said input apertures each being elongated along one of its dimensions, the minimum cross-sectional area of said material between any pair of adjacent input apertures being at least twice the minimum cross-sectional area in said material between any one of said input apertures and said output aperture, and the minimum cross-sectional area of material between said output aperture and the inner surface of any input aperture being substantially equal to the minimum cross-sectional area of material between the outer surface of an input aperture and the boundary of said body, a plurality of input windings, said input windings being threaded through said input apertures, an A.C. winding threaded through said output aperture, means for selectively applying an electrical impulse of either one or the other polarity to each of said input windings, and means for applying alternating electrical signals to said A.C. winding.

References Cited in the file of this patent

UNITED STATES PATENTS 2,640,164 Giel ------------------ May 26, 1953

OTHER REFERENCES

A publication entitled, "Edvac Progress Report #2," June 30, 1946 (pages PY-O-165, 4-22, and 4-23).

UNITED STATES PATENT OFFICE

CERTIFICATE OF CORRECTION

Patent No. 2,927,307 March 1, 1960

Jan A. Rajchman

It is hereby certified that error appears in the printed specification of the above numbered patent requiring correction and that the said Letters Patent should read as corrected below.

Column 5, line 26, for "currentt" read -- current --; line 68, for "inciden," read -- incident, --; column 9, between lines 8 and 9, insert the centered heading -- SUMMARY --.

Signed and sealed this 23rd day of August 1960.

(SEAL)

Attest:

KARL H. AXLINE
Attesting Officer

ROBERT C. WATSON
Commissioner of Patents